(12) United States Patent
Wolf et al.

(10) Patent No.: US 12,304,536 B2
(45) Date of Patent: May 20, 2025

(54) HYBRID COMMUNICATION SYSTEM

(71) Applicant: Westinghouse Air Brake Technologies Corporation, Pittsburgh, PA (US)

(72) Inventors: Charles L. Wolf, Olney, MD (US); Benjamin Henniges, Mount Airy, MD (US); Mark Uehling, Germantown, MD (US); Michael Silva, Olney, MD (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 946 days.

(21) Appl. No.: 17/397,978

(22) Filed: Aug. 9, 2021

(65) Prior Publication Data

US 2022/0055669 A1    Feb. 24, 2022

Related U.S. Application Data

(60) Provisional application No. 63/067,469, filed on Aug. 19, 2020.

(51) Int. Cl.
*B61L 15/00* (2006.01)
*B61L 25/02* (2006.01)
(Continued)

(52) U.S. Cl.
CPC ....... *B61L 15/0027* (2013.01); *B61L 15/0036* (2013.01); *B61L 25/028* (2013.01);
(Continued)

(58) Field of Classification Search
CPC ............. B61L 15/0027; B61L 15/0036; B61L 15/0018; B61L 25/028; B61L 27/04;
(Continued)

(56) References Cited

U.S. PATENT DOCUMENTS 7,711,325 B2 *  5/2010  Sathath ................. G06F 13/409
                                                                    455/66.1
9,037,339 B2 *  5/2015  Kanner ............... B61L 15/0027
                                                                    701/29.3
(Continued)

OTHER PUBLICATIONS

Third Examination Report received for related Australian Patent Application No. 2021218061 dated Mar. 1, 2023 (5 pages).
(Continued)

*Primary Examiner* — Zachary L Kuhfuss
*Assistant Examiner* — Cheng Lin
(74) *Attorney, Agent, or Firm* — K&L Gates LLP

(57) ABSTRACT

A communication system may be provided that includes a lead communication assembly configured to be disposed onboard a lead vehicle in a multi-vehicle system, and a remote communication assembly configured to be disposed onboard a remote vehicle in the multi-vehicle system. The lead communication assembly and the remote communication assembly may be configured to communicate with each other via a wired connection extending along the multi-vehicle system from at least the lead vehicle to at least the remote vehicle. Additionally, the lead communication assembly and the remote communication assembly may also be configured to communicate with each other via a wireless connection. The lead communication assembly and the remote communication assembly may also be configured to switch back-and-forth between communicating with each other via the wired connection and via the wireless connection.

19 Claims, 3 Drawing Sheets

(51) Int. Cl.
*H04W 24/04* (2009.01)
*H04W 48/18* (2009.01)

(52) U.S. Cl.
CPC ........... *H04W 24/04* (2013.01); *H04W 48/18* (2013.01); *B61L 2201/00* (2013.01); *B61L 2205/00* (2013.01)

(58) Field of Classification Search
CPC ............. B61L 2205/00; B61L 2201/00; B61L 15/0063; H04W 24/04; H04W 48/18
See application file for complete search history.

(56) References Cited

U.S. PATENT DOCUMENTS

| | | | | |
|---|---|---|---|---|
| 9,855,961 | B2* | 1/2018 | West | G01M 17/08 |
| 10,399,551 | B2* | 9/2019 | Naylor | B60T 7/124 |
| 10,530,676 | B2* | 1/2020 | Wolf | H04L 43/50 |
| 10,597,052 | B2* | 3/2020 | Dulmage | B61L 15/0063 |
| 2010/0029209 | A1* | 2/2010 | Daum | H04L 12/40189 |
| | | | | 398/5 |
| 2013/0325211 | A1 | 12/2013 | Fassi | |
| 2015/0210302 | A1* | 7/2015 | Kraeling | B61L 15/0036 |
| | | | | 701/117 |
| 2016/0009302 | A1* | 1/2016 | Bryant | B61L 15/0027 |
| | | | | 701/19 |
| 2016/0107661 | A1* | 4/2016 | Cooper | B61L 15/0072 |
| | | | | 246/167 R |
| 2019/0071107 | A1* | 3/2019 | Cooper | B61L 27/70 |
| 2019/0308647 | A1 | 10/2019 | Dulmage et al. | |
| 2020/0017105 | A1 | 1/2020 | Brooks et al. | |
| 2020/0139995 | A1* | 5/2020 | Loch | H04L 63/18 |

OTHER PUBLICATIONS

Fourth Examination Report received for related Australian Patent Application No. 2021218061 dated Jun. 5, 2023 (5 pages).
Examiner's Requisition received for related Canadian Patent Application No. 3,128,066 dated Jan. 28, 2023 (4 pages).
First Examination Report received for related Australian Patent Application No. 2021218061 dated Aug. 4, 2022 (8 pages).
Examiner's Requisition received for related CA Patent Application No. 3,128,066 dated Nov. 6, 2023 (3 pages).
Second Examination Report received for related Australian Patent Application No. 2021218061 dated Nov. 29, 2022 (4 pages).
First Examination Report received for related Indian Patent Application No. 202114036356 dated Mar. 31, 2022 (5 pages).

* cited by examiner

HYBRID COMMUNICATION SYSTEM

CROSS-REFERENCE TO RELATED APPLICATIONS

This application claims priority to U.S. Provisional Application No. 63/067,469 entitled Hybrid Communication System filed Aug. 19, 2020, hereby incorporated by reference herein.

BACKGROUND

Technical Field

The subject matter described relates to a communication system for a vehicle.

Discussion of Art

Vehicle communication systems may be used to communicate information to a vehicle system, from a vehicle system, and between different portions of a vehicle system. For example, rail vehicles may have numerous individual cars that combine to form a vehicle system, and may have a communication system that communicates from a car at the end of a vehicle to a locomotive at the front of the vehicle.

Trainline distributed power (TLDP) systems provide over-the-wire communication through tunnels, cities, etc. that would interfere with typical radio frequency (RF) communication. However, TLDP is unable to operate if the trainline becomes disconnected anywhere in the vehicle system between locomotive and end of the vehicle system. In some instances, hundreds of points may exist, all of which are potential failure points that can stop TLDP communication and operation.

BRIEF DESCRIPTION

In one or more embodiments, a communication system may be provided that includes a lead communication assembly configured to be disposed onboard a lead vehicle in a multi-vehicle system; and a remote communication assembly configured to be disposed onboard a remote vehicle in the multi-vehicle system. The lead communication assembly and the remote communication assembly may be configured to communicate with each other via a wired connection extending along the multi-vehicle system from at least the lead vehicle to at least the remote vehicle. Additionally, the lead communication assembly and the remote communication assembly may also be configured to communicate with each other via a wireless connection. The lead communication assembly and the remote communication assembly may also be configured to switch back-and-forth between communicating with each other via the wired connection and via the wireless connection.

In one or more embodiments, a method may be provided that includes establishing a first communication path from a lead communication assembly onboard a lead vehicle in a multi-vehicle system to a remote communication assembly onboard a remote vehicle in the multi-vehicle system, and establishing a second communication path from the lead communication assembly onboard the lead vehicle in the multi-vehicle system to the remote communication assembly onboard the remote vehicle in the multi-vehicle system. The method may also include monitoring the first communication path and the second communication path during operation of the multi-vehicle system.

In one or more embodiments, a communication system may be provided that may include a lead communication assembly configured to be disposed onboard a lead vehicle in a multi-vehicle system, and a remote communication assembly in communication with the lead communication assembly. The lead communication assembly and the remote communication assembly may be configured to communicate with each other via a wired connection extending along the multi-vehicle system from the lead vehicle to at least a remote vehicle. The lead communication assembly and the remote communication assembly may also be configured to communicate with each other via a wireless connection, and to switch back-and-forth between communicating with each other via the wired connection and via the wireless connection. In addition, the remote communication assembly may not be onboard a vehicle of the multi-vehicle system.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a communication system for a vehicle system that uses two separate communication paths to communication information to different portions of the vehicle system and to a remote location. In rail vehicle embodiments, the first communication path may be a line distributed power system that uses a wire to communication information. Meanwhile, the second communication path may be an over-the-air, radio frequency communication path. Advantageously, the first communication path may be used during set up to install the second communication path, reducing time for set up, even though two communication paths are being utilized. By having two communication pathways, and by monitoring each pathway, additional information may be gathered about each communication pathway. Consequently, a controller may be utilized to ensure that if a fault in one pathway is detected, that the other pathway is used for communication. In this manner, the controller may be used in association with a positive vehicle control (PVC) system to improve safety for the vehicle system and other vehicles using the same route.

A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. In addition, a PVC system may restrict movement and/or functionality of the multi-vehicle system or functionality of certain vehicles making up the multi-vehicle system. It could be that a PVC signal restricts a behavior of a communication systems; however, movement is not necessarily restricted.

Figure 1:
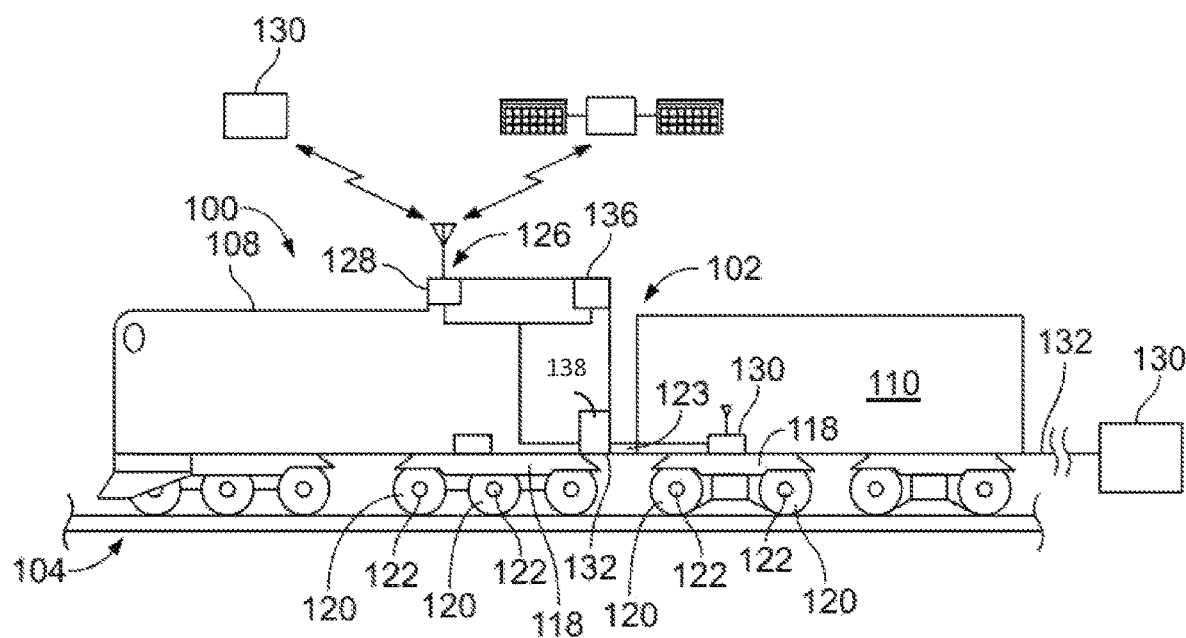
FIG. 1 illustrates a schematic diagram of a vehicle system.

FIG. 1 illustrates a illustrates a schematic diagram of a control system 100 according to an embodiment. The control system may be disposed on a vehicle system 102. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. In one example, the single vehicle may be a truck or an off-road vehicle.

The propulsion-generating vehicle may be configured to generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle may be referred to herein as a propulsion vehicle, and the non-propulsion-generating vehicle may be referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle. In one example, one of the propulsion vehicles may be a lead vehicle in a multi-vehicle system, where other vehicles are remote vehicles of the multi-vehicle system. In particular, the remote vehicles may be propulsion generating vehicles or non-propulsion generating vehicles.

The control system controls the movements of the vehicle system. In the illustrated embodiment, the control system may be disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 123. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system.

The control system may further include a communication system 126 that includes a lead communication assembly 128 and a remote communication assembly 130. The lead communication assembly may be on-board a lead vehicle, that in one example is a propulsion vehicle. The remote communication assembly may be on a remote vehicle, that can be a propulsion vehicle or non-propulsion vehicle, or at a location remote of the vehicle, such as at a dispatch. The communication system may include a line 132 that extends from the lead communication assembly to the remote communication assembly. By providing the line, the lead communication assembly may communicate with the remote communication assembly over-the-wire, based on a distributed power system. The communication system may also communicate with the remote communication assembly over-the-air, or wirelessly, based on a radio frequency. Optionally, the configuration information about the vehicle system can be communicated via the wired connection to set up the wireless connection. As an example, road numbers, vehicle location within the vehicle system, or the like, may be shared by the wire connection to assist in the wireless connection being located and activated.

The control system may have a controller 136, or control unit, that may be a hardware and/or software system which operates to perform one or more functions for the vehicle system. The controller receives information from components of the control system, analyzes the received information, and generates operational settings for the vehicle system to control the movements of the vehicle system. The controller may determine when either the line of the distributed power communication system is failing to provide a communication path, and automatically switch the communication path from the lead vehicle to one or more remote vehicles to a wirelessly based communication. The controller may then continue to monitor the line, and once the line is again permitting distributed power communication, the controller may automatically switch the communication path back to the line. The controller may monitor the line through hardware, such as a sensor 138, or through software. Still, the controller in a default may provide a communication path through the line, and only switches to the wireless based communication when the line is not operating to provide the communication path. Alternatively, the controller in default may provide a communication path through radio frequency, and only switches to the wire based communication when the radio frequency is not operating to provide the communication path. In yet another example the default is to use both the communication path through the line, and the communication path over radio frequency.

Figure 2:
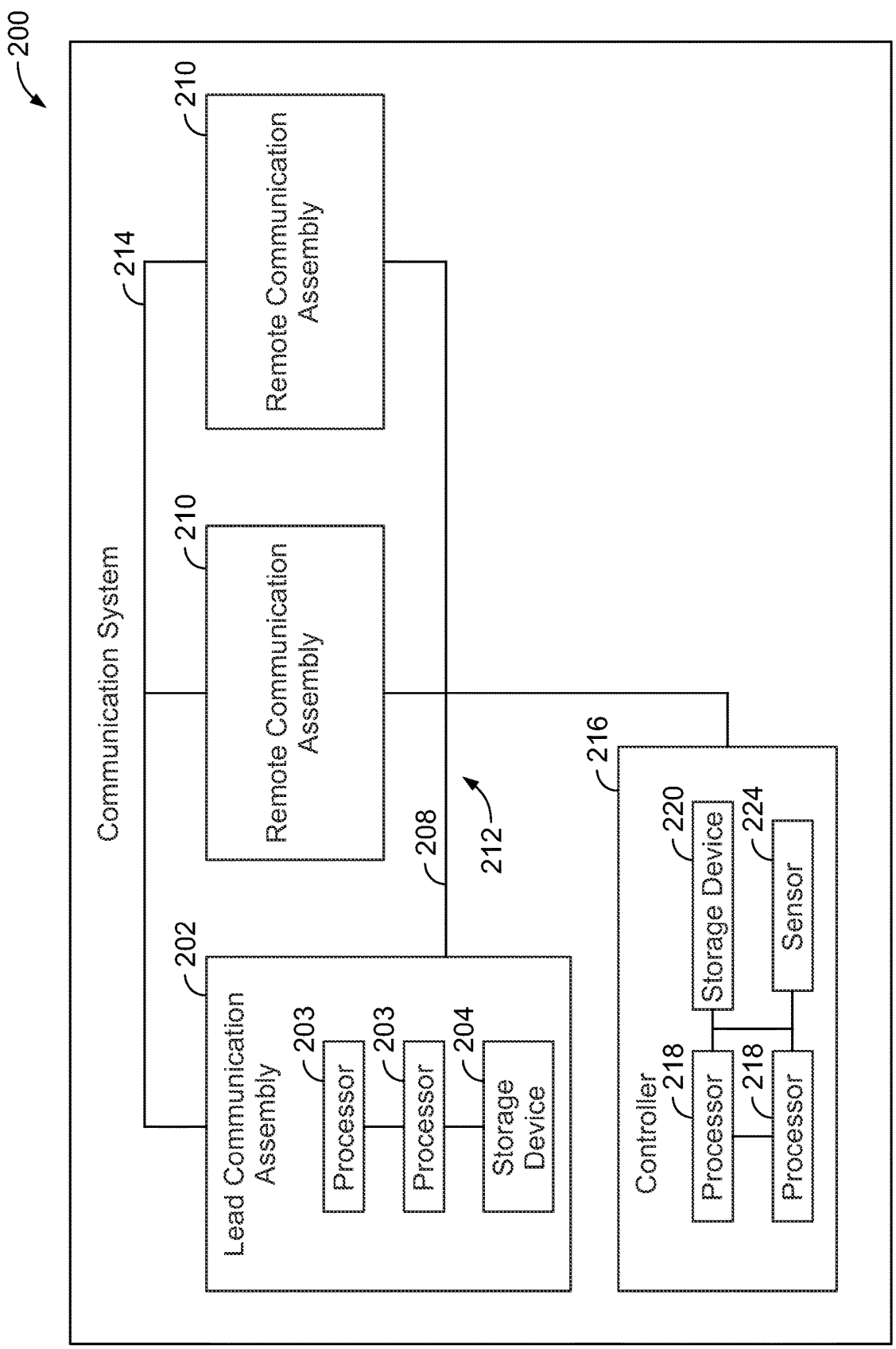
FIG. 2 illustrates a schematic diagram of a communication system.

FIG. 2 illustrates a communication system 200 that in one example is the communication system of FIG. 1. The communication system may include a lead communication assembly 202 that includes one or more processors 203, and a storage device 204 such as a memory. The lead communication assembly in one example may be disposed on a lead locomotive of a rail vehicle. Alternatively, the lead communication assembly may be in a lead vehicle of a fleet of vehicles. A line 208 may extend from the lead communication assembly to a remote communication assembly 210 to provide a wire based, or distributed power based first communication path 212. The line may represent a physical structure that is coupled to each vehicle within a vehicle system, such that the remote communication assembly may be within any vehicle within a vehicle system.

Numerous remote communication assemblies may be provided that may be coupled to the line and within different vehicles of the vehicle system. In an example, the vehicle system may be a rail vehicle having a lead locomotive where the lead communication assembly is located. The vehicle system may also have one hundred individual vehicles with every tenth vehicle being an auxiliary locomotive. Each auxiliary locomotive may have a remote communication assembly therein that couples to the line such that the communication path reaches each of the remote communication assemblies. Thus, the communication system may have one remote communication assembly, four remote communication assemblies, or more communication assemblies. This may include more remote assemblies than when only a wireless connection is provided.

In addition to the line, each of the remote communication assemblies may include a second communication path 214 with the lead communication assembly. The second communication path may be an over-the-air communication path, including through radio frequency. In this manner, two separate communication paths are provided between the lead communication assembly and each remote communication assembly.

The communication system additionally includes a controller 216 that may include one or more processors 218, a storage device 220, or memory, and at least one sensor 224. The controller may be operable to both manually, and automatically switch the communication path from the first communication path to the second communication path. In one example, the controller may have a default setting or communication path such as the first communication path. The controller may then monitor the line to determine if a break, malfunctioning, etc. is occurring. The controller may monitor the line based on sensors, signal breaks, or the like. In one example, the sensor may be a camera the monitors the physical line and the controller may be configured to determine based on pixel counts that when a physical break in the line has occurred. Alternatively, the sensor may detect communication traffic within the line, and when the traffic falls below a certain threshold, the controller may switch to the second communication path.

In yet another example, the controller may default to the second communication path and monitor the second communication path to determine when to automatically switch the communication path. In an example, a camera, trip plan, etc. may be used to determine when the vehicle is in a tunnel, or area that may disrupt over-the-air communications. When the vehicle is within such a region, the controller may automatically switch to the first communication path using the line.

In some embodiments, only one communication path is monitored, while in other embodiments, both the first communication path and second communication path may be simultaneously monitored. When both the first and second communication paths are monitored, an algorithm, mathematical equation, look-up table, or the like may be used to determine the best communication path for the vehicle. The controller may then switch the communication path based on the monitored information.

In yet other embodiments, both the first and second communication paths may be used simultaneously, without switching in between. By providing two communication paths, two redundant communication signals may be produced and compared to one another. In this manner, if one communication signal or path malfunctions, the redundant signal is not detected, and the failure can be identified accordingly.

In another embodiment, different communications may be sent over the different communication paths. For example, the first communication path may include a signal that only provides commands, while the second communication path may include a different signal that only provides replies. Thus, when the first communication path is a wired connection, and the second communication path is a wireless connection, commands may be provided by the wired connection and replies by the wireless connection.

In the example embodiment, the data derived from the communication system may be stored in the storage device of the controller. In particular, in some instances the communication system switches from one path to the other, for various reason, and the data related to the switching (e.g. location, date, time of day, weather conditions, etc.) may be stored as historical data. The historical data can be analyzed and utilized to refine trip plans, make additional investments in equipment, or the like to prevent communication system switches in certain situations.

In another example embodiment, the controller may, instead of switching the communication paths, switch the lead communication assembly. Specifically, the lead communication assembly may be switch so that one of the remote communication assemblies becomes the lead communication assembly, while the lead communication assembly becomes a remote communication assembly. Thus, if a malfunction happens between the lead and a first remote communication assembly, instead the connection between the lead communication assembly and all of the remote communication assemblies being in a malfunctioning condition, the lead communication assembly can switch to the first remote communication assembly that is still connected with the other remote communication assemblies. Thus, advantages of the system may still be realized during a trip, even with a malfunction or failure in part of the communication system. This may also be beneficial when a remote locomotive with a remote communication system is moved into the lead position.

Figure 3:
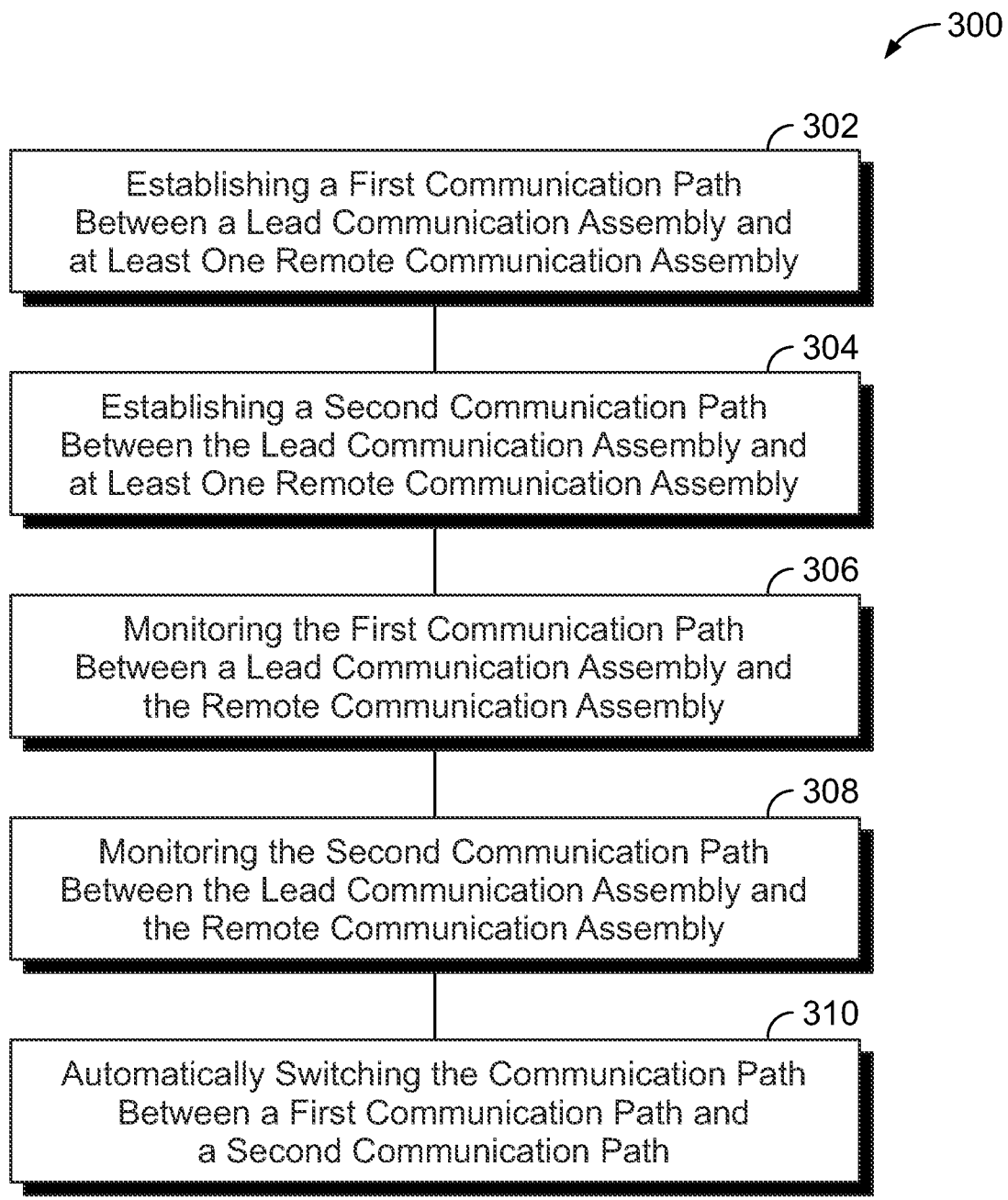
FIG. 3 illustrates a method of communicating.

FIG. 3 illustrates a method 300 of communicating information from a lead communication assembly to remote communication assemblies within a vehicle system. In one example, the vehicle system of FIG. 1, may be the vehicle system utilizing the method. In other examples, in addition to rail vehicles, off-road vehicles, automobiles, aircraft, watercraft, etc. may use the method. In an example, the control system used to perform the method is the control system as described in relation to FIG. 2.

At 302, a first communication path between a lead communication assembly and at least one remote communication assembly is established for a vehicle system. In one example, the first communication path is an over-the-wire connection that may be part of a line distributed power system of a rail vehicle. In such an example, remote communication assemblies may be placed onboard any vehicle within the rail vehicle, meaning there can be as many remote communication assemblies as there are vehicles in the rail vehicle.

At 304, a second communication path between a lead communication assembly and at least one remote communication assembly is established for the vehicle system. In one example, the second communication path is an over-the-air connection that may be a radio frequency based communication. In one example, up to four remote communication assemblies that have an over-the-air communication path are provided for a rail vehicle. In one embodiment, the second communication path may be formed, or set up at the same time as the first communication path. Alternatively, after the first communication path is established, such as when a line distributed power system is installed, the line distributed power system may be used to populate information, programming, software, vehicle data, vehicle location, or the like for the second communication path, when the second communication path is a radio frequency communication path. In particular, at least one portion of information from the first communication path may be used to establish the second communication path. In this manner, the set up and installation of the second communication path is facilitated.

At 306, a first communication path between a lead communication assembly and remote communication assembly is monitored. In one example, the lead communication assembly and remote communication assembly include a line that extends therebetween and is monitored, including with sensors, for breaks, damage, and the like. In another example, the first communication path is an over-the-air communication path, where the path itself, and characteristics or parameters related to the communication path, including potential blockage or bad reception areas, are monitored.

At 308, optionally, a second communication path between the lead communication assembly and remote communication assembly is monitored. While in one example a controller may set a default setting while only the communication of the default setting is monitored, in other examples, both communication paths may be monitored with no default setting provided.

At 310, optionally, a controller automatically switches the communication path between a first communication path and a second communication path based on the monitoring of at least one communication path. Again, in some examples, a controller may set a default setting while only the communication of the default setting is monitored. Then, when a problem in the communication path, including breaks, disconnects, or the like are detected, the controller automatically switches to the other communication path. The controller may continue to monitor the single communication path, and when the communication path is clear, or can adequately communication information, the controller automatically switches the communication path back to the original communication path. Alternatively, when both communication paths are monitored, the best communication path based on information gathered during monitoring may be determined. The best communication path may be based on an algorithm, mathematical equation, formula, look-up table, etc. The controller may then continually switch based on the monitoring. In yet another example, a trip plan may be used, and an area where poor quality is expected for a communication path may be noted. Then, based on time or distance, the controller may automatically switch the communication path at a determined time or location without monitoring either communication path. Alternatively, both communication paths may be used, and the information gathered from monitoring the signals of each communication path may be used for diagnostic, and operation purposes.

The controller may switch between the communication paths to increase the likelihood of clear communication during the entirety of a trip. Consequently, clear communication may be accomplished during a trip, even when one communication path has faults or difficulties. Additionally, in an event a communication path is unavailable for any reason, a second communication path may still be provided. Therefore, in a rail embodiment, if a line malfunctions and the rail vehicle is stuck on the track due to the failure, a communication path is still available for contacting remote devices and locations. Thus, when a PVC system is being utilized, the vehicle still has a communication path accordingly. In this manner, the PVC system may automatically slow movement of the vehicle system in response to detection of a communication issue with a lesser communication path. Additionally, locations of ends of the vehicle may be still communicated from PVC to dispatch with the additional communication path. So, the PVC system may be configured to be disposed onboard a lead vehicle and to remotely control the movement of the remote vehicle in a distributed power operating mode, including to communicate locations of opposite ends of the vehicle system to the vehicle system controller for use in controlling movement of the remote vehicle in the distributed power operating mode. Such functioning may be beneficial for many purposes, including when the trailing end of a vehicle system is clear of a location such as a crossing, or other area of interest.

In one or more embodiments, a communication system may be provided that includes a lead communication assembly configured to be disposed onboard a lead vehicle in a multi-vehicle system; and a remote communication assembly configured to be disposed onboard a remote vehicle in the multi-vehicle system. The lead communication assembly and the remote communication assembly may be configured to communicate with each other via a wired connection extending along the multi-vehicle system from at least the lead vehicle to at least the remote vehicle. Additionally, the lead communication assembly and the remote communication assembly may also be configured to communicate with each other via a wireless connection. The lead communication assembly and the remote communication assembly may also be configured to switch back-and-forth between communicating with each other via the wired connection and via the wireless connection.

Optionally, the wired connection may include a trainline and the lead communication assembly and the remote communication assembly are configured to communicate with each other via the wireless connection using radio frequency signals. In another example, the remote communication assembly may be configured to communicate configuration information about one or more of the remote vehicle or the multi-vehicle system to the lead communication assembly via the wired connection, and the lead communication assembly may be configured to establish the wireless connection using the configuration information that is received via the wired connection. In another aspect, the multi-vehicle system may be a rail vehicle system moving using distributed power, and the lead communication assembly may be configured to send command signals to control movement of the rail vehicle system to more than four remote locomotives in the rail vehicle system via the wired connection.

Optionally, the lead communication assembly and the remote communication assembly may be configured to switch from communicating via the wireless connection to communicating via the wired connection responsive to a communication deterioration in the wireless connection occurring. In another aspect, the lead communication assembly and the remote communication assembly may be configured to switch from communicating via the wired connection to communicating via the wireless connection responsive to a communication deterioration in the wired connection occurring. In another example, one or more of the lead communication assembly or the remote communication assembly may be configured to communicate the same signal via both the wired connection and the wireless connection.

In yet another aspect, the lead communication assembly and the remote communication assembly may be configured to communicate a first type of information via the wired connection and to communication a different, second type of information via the wireless connection. Optionally, the lead communication assembly may be configured to communicate configuration information about the multi-vehicle system to the remote communication assembly to change which of the vehicles in the multi-vehicle system is the lead vehicle. In an example, the lead communication assembly may be configured to identify a type of communication failure by sending signals to the remote communication assembly via both the wired connection and the wireless connection.

Optionally, the communication system may also include a positive vehicle control system configured to restrict movement of the multi-vehicle system based on receipt of one or more positive control signals. The positive vehicle control system may be configured to automatically slow the movement of the multi-vehicle system responsive to deterioration of communication between the lead communication assembly and the remote communication assembly via the wireless connection. Alternatively, the communication system may include a positive vehicle control system configured to restrict movement of the multi-vehicle system based on receipt of one or more positive control signals, and a vehicle system controller configured to be disposed onboard the lead vehicle and to remotely control the movement of the remote vehicle in a distributed power operating mode. The positive vehicle control system may be configured to communicate locations of opposite ends of the multi-vehicle system to the vehicle system controller for use in controlling the movement of the remote vehicle in the distributed power operating mode.

Optionally, the communication system may also include a vehicle system controller configured to control movement of the multi-vehicle system, the remote communication assembly configured to communicate a location of a trailing end of the multi-vehicle system via the wired connection to the vehicle system controller. In one aspect, the vehicle system controller may be configured to determine whether the trailing end of the multi-vehicle system has cleared an area of interest based on the location of the trailing end of the multi-vehicle system being communicated.

In one or more embodiments a method may be provided that includes establishing a first communication path from a lead communication assembly onboard a lead vehicle in a multi-vehicle system to a remote communication assembly onboard a remote vehicle in the multi-vehicle system, and establishing a second communication path from the lead communication assembly onboard the lead vehicle in the multi-vehicle system to the remote communication assembly onboard the remote vehicle in the multi-vehicle system. The method may also include monitoring the first communication path and the second communication path during operation of the multi-vehicle system.

In another embodiment, the method may also include using the first communication path for communication signals during operation of the multi-vehicle system, and switching from the first communication path to the second communication path for the communication signals based on monitoring the first communication path or second communication path. Alternatively, the method may include comparing a communication signal monitored in the first communication path to a communication signal monitored in the second communication path.

Optionally, establishing the second communication path may include receiving at least one input from the first communication path. In another aspect, the first communication path may be a line communication path, and the second communication path may be a radio frequency communication path.

In one or more embodiments, a communication system may be provided that may include a lead communication assembly configured to be disposed onboard a lead vehicle in a multi-vehicle system, and a remote communication assembly in communication with the lead communication assembly. The lead communication assembly and the remote communication assembly may be configured to communicate with each other via a wired connection extending along the multi-vehicle system from the lead vehicle to at least a remote vehicle. The lead communication assembly and the remote communication assembly may also be configured to communicate with each other via a wireless connection, and to switch back-and-forth between communicating with each other via the wired connection and via the wireless connection. In addition, the remote communication assembly may not be onboard a vehicle of the multi-vehicle system. Optionally, the remote communication assembly may be a dispatch controller.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A communication system comprising:
    a lead communication assembly configured to be disposed onboard a lead vehicle in a multi-vehicle system;
    a remote communication assembly configured to be disposed onboard a remote vehicle in the multi-vehicle system,
    wherein the lead communication assembly and the remote communication assembly are configured to communicate with each other via a wired connection extending along the vehicle system from at least the lead vehicle to at least the remote vehicle,
    wherein the lead communication assembly and the remote communication assembly also are configured to communicate with each other via a wireless connection, and
    wherein the lead communication assembly and the remote communication assembly are configured to switch back-and-forth between communicating with each other via the wired connection and via the wireless connection,
    wherein the lead communication assembly is configured to identify a type of communication failure by sending signals to the remote communication assembly via both the wired connection and the wireless connection.

2. The communication system of claim 1, wherein the wired connection includes a trainline and the lead communication assembly and the remote communication assembly are configured to communicate with each other via the wireless connection using radio frequency signals.

3. The communication system of claim 1, wherein the remote communication assembly is configured to communicate configuration information about one or more of the remote vehicle or the multi-vehicle system to the lead communication assembly via the wired connection, wherein the lead communication assembly is configured to establish the wireless connection using the configuration information that is received via the wired connection.

4. The communication system of claim 1, wherein the multi-vehicle system is a rail vehicle system moving using distributed power, and wherein the lead communication assembly is configured to send command signals to control movement of the rail vehicle system to more than four remote locomotives in the rail vehicle system via the wired connection.

5. The communication system of claim 1, wherein the lead communication assembly and the remote communication assembly are configured to switch from communicating via the wireless connection to communicating via the wired connection responsive to a communication deterioration in the wireless connection occurring.

6. The communication system of claim 1, wherein the lead communication assembly and the remote communication assembly are configured to switch from communicating via the wired connection to communicating via the wireless connection responsive to a communication deterioration in the wired connection occurring.

7. The communication system of claim 1, wherein one or more of the lead communication assembly or the remote communication assembly is configured to communicate the same signal via both the wired connection and the wireless connection.

8. The communication system of claim 1, wherein the lead communication assembly and the remote communication assembly are configured to communicate a first type of information via the wired connection and to communication a different, second type of information via the wireless connection.

9. The communication system of claim 1, wherein the lead communication assembly 1s configured to communication configuration information about the multi-vehicle system to the remote communication assembly to change which of the vehicles in the multi-vehicle system is the lead vehicle.

10. The communication system of claim 1, further comprising:
    a positive vehicle control system configured to restrict movement of the multi-vehicle system based on receipt of one or more positive control signals, wherein the positive vehicle control system is configured to automatically slow the movement of the multi-vehicle system responsive to deterioration of communication between the lead communication assembly and the remote communication assembly via the wireless connection.

11. The communication system of claim 1, further comprising:
    a positive vehicle control system configured to restrict movement of the multi-vehicle system based on receipt of one or more positive control signals; and
    a vehicle system controller configured to be disposed onboard the lead vehicle and to remotely control the movement of the remote vehicle in a distributed power operating mode, wherein the positive vehicle control system is configured to communicate locations of opposite ends of the multi-vehicle system to the vehicle system controller for use in controlling the movement of the remote vehicle in the distributed power operating mode.

12. The communication system of claim 1, further comprising:
a vehicle system controller configured to control movement of the multi-vehicle system, the remote communication assembly configured to communicate a location of a trailing end of the multi-vehicle system via the wired connection to the vehicle system controller, the vehicle system controller configured to determine whether the trailing end of the multi-vehicle system has cleared an area of interest based on the location of the trailing end of the multi-vehicle system being communicated.

13. A method comprising:
establishing a first communication path from a lead communication assembly onboard a lead vehicle in a multi-vehicle system to a remote communication assembly onboard a remote vehicle in the multi-vehicle system;
establishing a second communication path from the lead communication assembly
onboard the lead vehicle in the multi-vehicle system to the remote communication assembly onboard the remote vehicle in the multi-vehicle system; and
monitoring the first communication path and the second communication path during operation of the multi-vehicle system,
wherein the lead communication assembly is configured to identify a type of communication failure by sending signals to the remote communication assembly via both the wired connection and the wireless connection.

14. The method of claim 13; further using the first communication path for communication signals during operation of the multi-vehicle system; and
communication signals based on monitoring the first communication path or second communication path.

15. The method of claim 13, further comprising: comparing a communication signal monitored in the first communication path to a communication signal monitored in the second communication path.

16. The method of claim 13, wherein establishing the second communication path includes receiving at least one input from the first communication path.

17. The method of claim 13, wherein the first communication path is a line communication path, and the second communication path is an radio frequency communication path.

18. A communication system comprising:
a lead communication assembly configured to be disposed onboard a lead vehicle in a multi-vehicle system;
a first remote communication assembly in communication with the lead communication assembly,
a second remote communication assembly in communication with the lead communication assembly, wherein the second remote communication assembly is not onboard a vehicle of the multi-vehicle system;
wherein the lead communication assembly and the first remote communication assembly are configured to communicate with each other via a wired connection extending along the multi-vehicle system from the lead vehicle to at least a remote vehicle,
wherein the lead communication assembly, the first remote communication assembly, and the second remote communication assembly also are configured to communicate with each other via a wireless connection, wherein the lead communication assembly and the remote communication assembly are configured to switch back-and-forth between communicating with each other via the wired connection and via the wireless connection; and
wherein the lead communication assembly is configured to identify a type of communication failure by sending signals to the first or second remote communication assembly via the wired connection or the wireless connection.

19. The communication system of claim 18, wherein the second remote communication assembly is a dispatch controller.

* * * * *